United States Patent

Isaman

[11] Patent Number: 5,926,634
[45] Date of Patent: Jul. 20, 1999

[54] LIMITED RUN BRANCH PREDICTION

[75] Inventor: David L. Isaman, San Diego, Calif.

[73] Assignee: Hyundai Electronics America, San Jose, Calif.

[21] Appl. No.: 08/731,367

[22] Filed: Oct. 11, 1996

Related U.S. Application Data

[63] Continuation of application No. 08/348,519, Dec. 2, 1994, abandoned.

[51] Int. Cl.[6] .................................................. G06F 9/40
[52] U.S. Cl. .................................................. 395/586
[58] Field of Search .................................. 395/586, 587

[56] References Cited

U.S. PATENT DOCUMENTS 4,764,861   8/1988   Shibuya ................................ 395/375
5,367,703  11/1994   Levitan ................................. 395/800
5,394,529   2/1995   Brown et al. ......................... 395/375

*Primary Examiner*—David Y. Eng
*Attorney, Agent, or Firm*—Townsend and Townsend and Crew LLP

[57] ABSTRACT

A branch prediction technique which increases the likelihood of correctly predicting the direction of a conditional branch instruction is presented. The technique is based on the observation that many branches have run lengths that are constant or slowly-varying. I.e., several consecutive runs of 1's are of the same length. The technique uses the history stored for each branch, which history is enhanced by two small counters, an up counter and a down counter. These counters operate in conjunction with a state machine branch predictor of the prior art for very accurate predictions.

26 Claims, 4 Drawing Sheets

| STATE | UP | DOWN | PREDICTION | ACTUAL |
|---|---|---|---|---|
| 1 | 11 | 3 | 0 | 0 | 0 |
| 2 | 10 | 0 | 3 | 1 | 1 |
| 3 | 11 | 1 | 2 | 1 | 1 |
| 4 | 11 | 2 | 1 | 1 | 1 |
| 5 | 11 | 3 | 0 | 0 | 0 |
| 6 | 10 | 0 | 3 | 1 | 1 |

*FIG. 5A.*

| STATE | UP | DOWN | PREDICTION | ACTUAL |
|---|---|---|---|---|
| 1 | 11 | 3 | 0 | 0 | 0 |
| 2 | 10 | 0 | 3 | 1 | 1 |
| 3 | 11 | 1 | 2 | 1 | 1 |
| 4 | 11 | 2 | 1 | 1 | 0 |
| ⋮ | | | | | |
| 4' | 11 | 2 | 1 | 1 | 0 |
| 5 | 10 | 0 | 2 | 1 | 1 |
| 6 | 11 | 1 | 1 | 1 | 1 |
| 7 | 11 | 2 | 0 | 0 | 1 |
| ⋮ | | | | | |
| 7' | 11 | 2 | 0 | 0 | 1 |
| 8 | 10 | 3 | MAX | 1 | 1 |
| 9 | 11 | 4 | MAX | 1 | 0 |
| ⋮ | | | | | |
| 9' | 11 | 4 | MAX | 1 | 0 |
| 10 | 10 | 0 | 4 | 1 | 1 |

*FIG. 5B.*

LIMITED RUN BRANCH PREDICTION

This is a Continuation of application Ser. No. 08/348,519, filed Dec. 2, 1994 now abandoned, the disclosure of which is incorporated by reference.

BACKGROUND OF THE INVENTION

Performance of pipelined processors is severely limited by the time required to execute conditional branches. A processor normally fetches and executes instructions in a sequential fashion; i.e., the address of the instruction Ei+1 executed immediately after an instruction Ei (the successor of Ei) fetched from address n is found by adding the length of Ei to n. An unconditional branch is an instruction whose execution causes a transfer of control to an instruction at a non-sequential address. Thus the successor of a branch B is fetched from an arbitrary target address. In some computers, the target address of branch instruction B is contained within the instruction, while in others the target is formed by adding an offset contained within the instruction B to the address from which B itself was fetched.

A conditional branch instruction conditionally causes a transfer of control, based on testing some piece of data. Along with a specification of a target address, such an instruction contains a condition to be tested. This condition is typically one of a small set of algebraic properties of a number: the number is or is not zero, the number is or is not positive, the number is or is not negative, etc. If the condition is met, the branch is taken; i.e., the successor instruction is fetched from the target address of the branch. If the condition is not met, the successor instruction is the next instruction in sequence, just as for non-branch instructions.

Pipelined computers pass each instruction through a pipeline consisting of several processing stages, usually at least five. A new instruction can be entered into the pipeline during each clock cycle. As a consequence, a pipelined computer can have several instructions in different stages of execution simultaneously, thus maximizing the utilization of the hardware resources at each stage.

The performance degradation caused by conditional branches in pipelined computers arises when the branch is fetched before the algebraic conditions of the data to be tested have been determined. This phenomenon is worst in those computers in which the branch instruction itself specifies the location of the data to be tested. Evaluating the algebraic conditions is done only after several stages of the pipeline have been traversed. Since this cannot start until the branch instruction is fetched, the conditions to be tested are not known until several clock cycles after the branch is fetched. Since the location of the next instruction to be fetched cannot be determined for certain until the data have been tested, no instructions can be fetched for several clock cycles.

Branch prediction is an attempt to predict, immediately upon fetching a conditional branch, whether or not the branch will be taken, without waiting to determine the outcome of the test. In this way, instructions can continue to be fetched at full rate. If branches are predicted, it becomes necessary to validate the prediction and to recover from an incorrect prediction. If the prediction was incorrect, then all the instructions fetched after the incorrectly-predicted ("bad") branch were fetched in error, and so the effects of their execution must be reversed. Techniques for recording, validating, and repairing predicted branches are not the subject of the present invention.

Since all instructions fetched after a bad branch must be discarded, they represent wasted effort. Therefore the performance of the machine is directly related to the accuracy of branch predictions.

Branch prediction schemes can be either static or dynamic. In a static scheme, the branch instruction itself contains the prediction; this is typically supplied by the compiler that produced the program, based on the compiler having executed the program on a typical data set. Static prediction is possible only if the instruction set of the computer has been designed with that in mind. Most commercially-successful instruction sets do not provide facilities that allow static branch prediction.

Dynamic branch prediction uses information about the branch that is gathered by the hardware during program execution. The hardware can only "know" about past execution patterns of a given branch instruction and so must base its dynamic prediction on such information. Since conditional branches are quite frequent (as dense as one in every five instructions), the amount of history that can be stored for each cannot be very large without requiring a very large memory capacity. Typically branch prediction information is kept on only a small, but varying, subset of the branches in a program.

The correct execution history of a given branch instruction at any point in time during execution of a program can be represented as a sequence of binary symbols 1 and 0. This sequence tells whether the branch instruction was taken (1) or not taken (0). Each time a branch instruction is executed, the history of that branch is extended by adding a 1 or 0 to its end, depending on whether the correct (not necessarily the predicted) execution of the branch was taken or not.

A branch instruction's execution history can be partitioned into runs. A branch run is a sequence of consecutive 0's immediately preceded and followed by a 1, or vice versa. I.e., each symbol in the history is in exactly one run and each run consists of all 0's or all 1's. The length of a run is the number of symbols in it.

Prior art dynamic branch prediction mechanisms exploit the observation that for many branches in a program, all, or almost all, of the runs of 0's are of length one. These are usually branches that end loops. A loop is implemented typically by placing a conditional branch at the end of the sequence of instructions that constitute the body of the loop. The conditional branch tests the loop-ending condition and branches to the first instruction in the sequence that is the loop body if that condition is false. The loop is terminated if that branch is not taken. The next time that branch is executed will be the first execution in the next activation of the loop, which will be taken unless this activation terminates after one traversal. Thus there is a run consisting of a single 0 representing the loop termination. (Some compilers construct loops with a conditional branch at the beginning of the body rather than at the end. Such a loop is terminated by taking the branch. This loop construct gives rise to execution histories with runs consisting of a single 1.)

Prior art branch predictors base each prediction on two bits of stored history for each branch. These bits are the state of a four-state state machine (FIG. 1). The effect of this state machine is to predict that the branch will have the same outcome as the last run of length greater than one. Therefore, in the case of a loop that is always traversed more than once, so that its execution history has no run of two or more 0's, the prediction will be constant.

The prediction accuracy of this prior-art state machine is directly related to the lengths of the runs of 1's. If the average run length is n, then there is one incorrect prediction for every n correct predictions. Thus the efficiency is worse for shorter runs. The purpose of the invention is to improve the prediction accuracy for short-run-length branches.

SUMMARY OF THE INVENTION

Many branches have run lengths that are constant or slowly-varying, i.e., several consecutive runs of 1's are of the same length. The present invention enhances the history stored for each branch by adding two small counters, an up counter and a down counter. The counters operate in conjunction with the state machine branch predictor of the prior art.

The up counter counts the length of the current run. If the run ends before the counter overflows, the up counter value is copied to the down counter and the up counter is re-initialized to zero. The down counter then counts down during the next run. The prediction used is that made by the state machine until the down counter reaches zero. At the first execution at which the down counter is zero, the state machine prediction is complemented. This will be correct if the length of the current run is equal to the length of the previous run. As long as the run length remains constant, the prediction accuracy of this invention is 100%. If the run is longer than can be counted, the counters are disabled and prediction is based on the state machine alone.

Each time any conditional branch instruction B is issued, its prediction history is examined to determine whether to predict the branch as taken or not, and that history is immediately updated based in part on the prediction. The updating also depends on whether or not this is a re-issue of B. A re-issue of B occurs only when any execution BE of B was predicted incorrectly, the correct direction is now known, and no execution of any branch that precedes BE is known to have been incorrectly predicted. In this case, a branch repair to BE occurs: BE and all executions of any subsequent instructions are discarded and B is re-issued.

The algorithm for updating the counters is based on the assumption that the state machine predictor always predicts the same direction. Therefore, the end of a run is predicted solely by the counters. A re-issue means that the run length was not correctly predicted: either no prediction as to run length was made, or the run length was predicted to be too short or too long. If the run length had not been predicted at all, because the previous run was too long to count, the up counter is set to 0, in case the newly starting run is short enough to count, and the down counter is set to −1, which disables the predictor of the counters. If the re-issued branch had been predicted wrong because the run ended earlier than expected, the new, shorter length is copied from the up counter to the down counter and the up counter is reset to 0. If the predicted run length was too short, the up counter continues to increment, to count the correct longer length, and the down counter is set to −1, as it is known that the end of this longer run cannot be correctly predicted.

On any issue of a branch that is not a re-issue, if the up counter has reached its maximum count, the counter stays at that count and the down counter is set to −1, preventing any run length prediction of the counters. Otherwise, the up counter is incremented unless the down counter is 0, indicating the predicted end of the run; in this case, the up counter is copied to the down counter and then reset to 0. If the up counter is not at its maximum and the down counter is not disabled, then the down counter decrements unless it has reached 0.

The added state information that must be stored for each branch by this invention is substantial. Fortunately a small number of bits gives a high performance gain. Three-bit counters correctly predict all constant run lengths less than seven. The shortest run length not correctly predicted, seven, has an accuracy from the state machine predictor alone of 87%. Four-bit counters give at least 93% accuracy.

BRIEF DESCRIPTION OF THE DRAWINGS

FIG. 5A illustrates the operation of the branch predictor for a set of instructions with a conditional branch instruction with a constant run length, according to the present invention; and FIG. 5B illustrates the operation of the branch predictor for a set of instructions with conditional branch instructions with varying run lengths, according to the present invention.

DESCRIPTION OF PREFERRED EMBODIMENT (S)

The preferred embodiment of the invention is in a superscalar processor. A superscalar processor fetches and issues multiple instructions per clock cycle into the pipeline, in this case, up to four instructions. An example of a superscalar processor which benefits from the present invention is described in U.S. Ser. No. 07/622,893, entitled 'Processor Architecture,' filed on Dec. 5, 1990 by Popescu et al. Since not all elements of the processor are pertinent to the present invention, some of these elements are not included in the description of the present invention.

Figure 2:
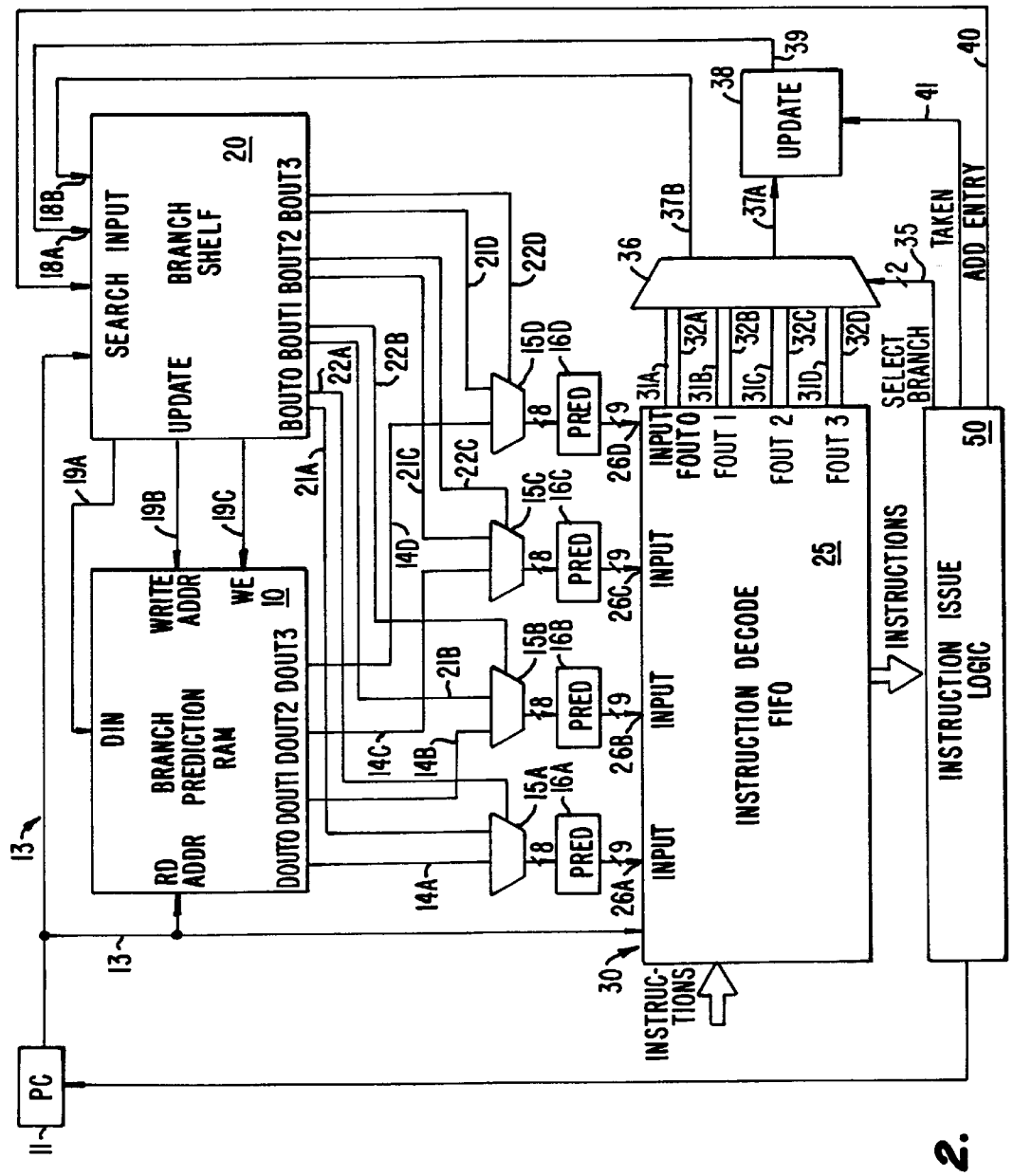
FIG. 2 is a block diagram of a branch predictor of one embodiment of the present invention.

With respect to the prediction of branching instructions and the present invention, the execution histories of all branches are stored in two structures, a Branch Prediction RAM 10 and a Branch Shelf 20 in the processor, as shown in FIG. 2. The Branch Prediction RAM 10 stores all of the history of branch executions up to but not including the oldest unresolved predicted branch. The Branch Shelf 20 holds the history of all branch executions that are or follow an unresolved predicted branch.

In the preferred embodiment the Branch Prediction RAM 10 consists of 1K (1024) words. For reading the Branch Prediction RAM 10, the processor's program counter register 11 addresses the RAM 10 over an address bus 13 with a value PC. PC is the memory address of the instruction that is being fetched next in the processor. The Branch Prediction RAM 10 has four Data Out ports, Dout0–Dout3, connected to output lines 14A–14D respectively. Through these four ports are passed the branch prediction states for the instructions at the four addresses PC, PC+1, PC+2, and PC+3 respectively, to accommodate the superscalar nature of the processor. Of course, it should be understood that the present invention is equally applicable to a simple scalar processing.

The Branch Prediction RAM 10 is double-word addressed. That is, the least-significant bit of PC over the address bus 13 is ignored. Therefore, two consecutive instructions, one at an even PC value and the one at the next higher odd PC value, are necessarily assigned the same prediction history from the Branch Prediction RAM 10. It is assumed that it is rare for two consecutive branch instructions to appear and, in this manner, the 1K-deep RAM 10 can store unique prediction histories for up to 2K instructions.

The Branch Prediction RAM 10 is not a cache. Its contents may or may not reflect exactly the prediction state of a given branch instruction. For example, two instructions whose PC values differ by exactly a multiple of 2K will alias. The histories of both instructions will be stored in the same RAM word, and so will probably interfere destructively. This is permitted because the Branch Prediction RAM 10 is only a prediction mechanism; every branch prediction is later verified and repaired if incorrect. Therefore, destructive aliasing results only in a potential degradation in prediction accuracy and thus performance; the size of the Branch Prediction RAM 10 is balanced against the performance degradation.

The Branch Shelf 20 is a 12-deep content-addressable First-In, First-Out (FIFO) structure that stores the prediction histories of all speculative branch instructions. All instruction executions that are or that follow a predicted branch execution for which the correct direction is not yet known are speculative executions. The Branch Shelf 20 has a Search port connected to the address bus 13, an Input port connected to three lines 37B, 39 and 40, which are described below, and an Update port connected to the Branch Prediction RAM 10.

The Branch Shelf 20 stores the branch prediction histories of the speculative branch executions in the order in which they were issued. Each entry stored in the Branch Shelf 20 has two parts relevant to the present invention: the prediction history of a conditional branch instruction and the address of that instruction. One new entry is added into the Branch Shelf 20 via the Input port at each clock cycle when the Add Entry signal 40 is true, i.e., a logic "1".

The Branch Shelf 20 operates like a stack of shelves. Each entry is written into the "bottommost" empty location. The bottommost location can be removed via the Update port into the Branch Prediction RAM 10. The Update port has three lines: a data bus 19A to transfer the prediction history data of the conditional branch instruction in the bottommost location of the Branch Shelf 10, an address bus 19B to transfer the address of the conditional branch instruction in the bottommost location, and a Write Enable control line 19C to signal to the Branch Prediction RAM 10 that a Write operation is to be performed. When this removal occurs, all entries in the Branch Shelf 20 are shifted down by one. Branch repair involves deleting the entry for the branch execution discovered to have been mispredicted, along with all entries above it. In this way, all valid entries in the Branch Shelf 20 are stored contiguously from the bottommost entry, in the order in which they were entered.

When a PC value is applied through the address bus 13 to the Search port of the Branch Shelf 20, the PC, PC+1, PC+2, and PC+3 addresses are compared simultaneously with each of the stored branch instruction addresses, and with the address at the Input port, if the Add Entry signal is true. The results of these comparisons are sent from the Branch Shelf 20 on four data output ports, Bout0–Bout3. Each data output port of the Branch Shelf 20 has two parts and is connected to two sets of lines. One set is a one-bit Match line, 22A–22D for each port, Bout0–Bout3, respectively. The other set is a data bus, 21A–21D for each port, Bout0–Bout3 respectively, for the prediction history data for each of the stored branch instruction addresses. The Match lines 22A–22D on these output ports carry a logic "1" if and only if there is at least one stored address which matches PC, PC+1, PC+2, or PC+3 respectively. For any port whose Match line 22A–22D is logic "1", the corresponding prediction history data at that port is that stored in the topmost (most-recently-entered) entry whose address matches (where the value at the Input port is considered topmost).

The Match lines 22A–22D are connected to and control 2-to-1 multiplexors 15A–15D respectively. For each data output port, Bout0–Bout3, having a Match line 22A–22D at a logic 1, the corresponding multiplexor 15A–15D selects the data bus 21A–21D from the Branch Shelf 20. The prediction history data from that port is selected as output for that multiplexor 15A–15D. If the data output port Match line 22A–22D is a logic 0, the output of the corresponding multiplexor 15A–15D selects the prediction history data from the corresponding data output port, Dout0–Dout3, of the Branch Prediction RAM 10 on the buses 14A–14D.

With this arrangement, the outputs of the four multiplexors 15A–15D are the most recent prediction histories for any branches at PC, PC+1, PC+2, and PC+3. At any point in time, if there is a branch instruction B at PC+i, where i=0, 1, 2, 3, there are two possibilities: no speculative execution of B exists, or one or more speculative executions exist. In the former case, the Match line 22A–22D corresponding to PC+1 from the Branch Shelf 20 is logic 0, so the output of the multiplexor 15A–15D is from the Branch Prediction RAM 10 on the corresponding output bus 14A–14D. The output signal from the multiplexor 15A–15D represents the history of the branch instruction B up through its most recent execution which, in this case, was non-speculative.

If there is a speculative execution of B, then a Match line 22A–22D from one of the output ports, Bout0–Bout3, of the Branch Shelf 20 carries a logic 1 signal and the prediction history output of that port is that after the most recent speculative execution of B. Since all speculative executions are more recent than all non-speculative executions, this is the most recent execution, and is selected as output by the corresponding multiplexor 15A–15D.

The output bus of each multiplexor 15A–15D is the input bus of one of four identical Predict modules 16A–16D. Each Predict module 16A–16D, shown in FIG. 3, examines the prediction history data from its respective multiplexor 15A–15D to determine the prediction for the present execution of the branch instruction. The prediction history data has eight bits, consisting of a two-bit prediction state, a three-bit up-counter value and a three-bit down-counter value. The prediction history data is carried on eight bus lines forming the output bus of each multiplexor 15A–15D.

Figure 3:
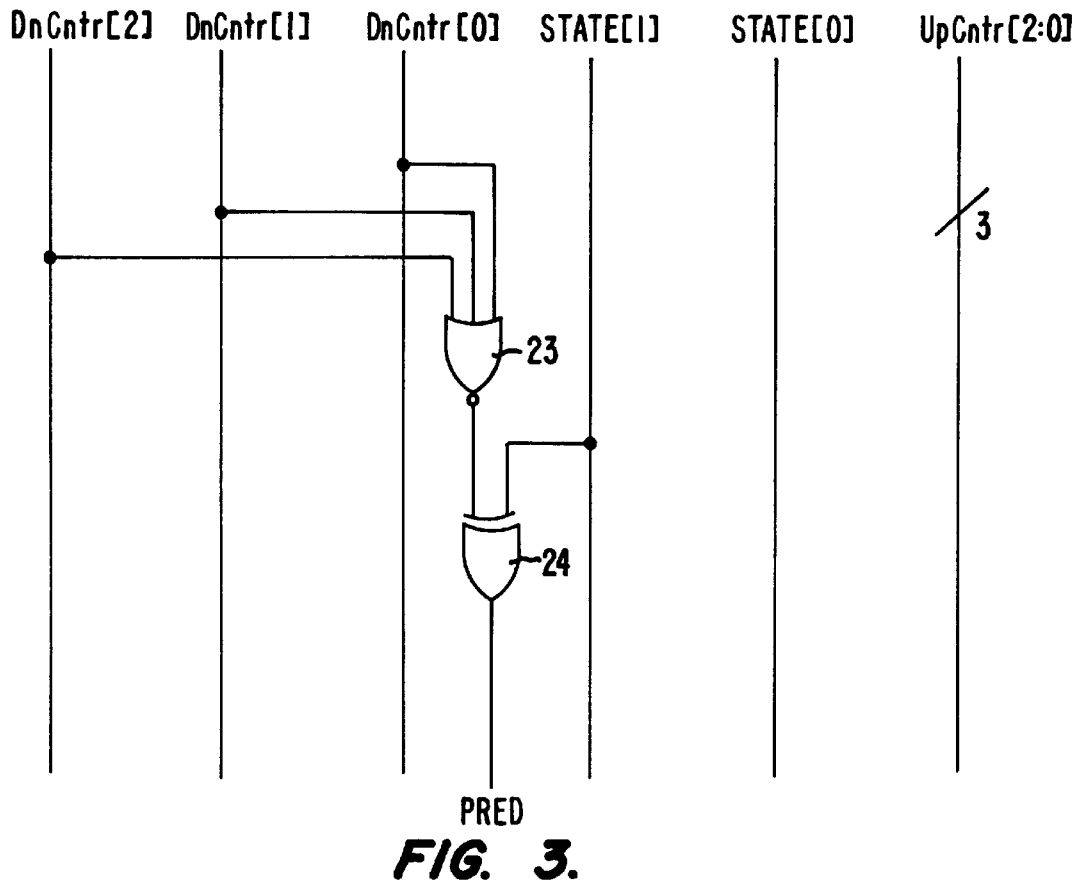
FIG. 3 is a circuit diagram of a Predict module in FIG. 2.

Each Predict module 16A–16D has a NOR gate 23 and an Exclusive-OR gate 24. The NOR gate 23 receives the three bits of the down-counter as input, and the output of the NOR gate 23 is connected as one input to the Exclusive-OR gate 24. A second input to the Exclusive-OR gate 24 is the more significant bit of the prediction state, State [1], of the prediction state bits. As shown in FIG. 3, the less significant bit, State [0], and the three bits of the up-counter pass through the Predict Module 16A–16D without connection to the NOR gate 23 and Exclusive-OR gate 24.

It is seen that the prediction given by the state machine is equal to the most significant bit of the state, State[1]. A down-counter value of zero (all three bits equal to logic 0) causes the NOR gate 23 to generate an output logic 1, which in turn causes the Exclusive OR gate 24 to complement the value of State[1]. If the down-counter is non-zero, the NOR gate 23 has an output of logic 0, which causes the Exclusive-OR gate 24 to output the value of State[1]. The output of the Exclusive OR gate 24 is the prediction value.

The output of the Predict modules 16A–16D, the eight bits of prediction history data plus the current prediction for each of the four instructions at PC+i, i=0 to 3, are connected respectively to input ports 26A–26D of an Instruction Decode FIFO 25. The FIFO 25 is five instructions deep and stores instructions from the time they are fetched from the Instruction Cache (not shown) until they can be issued to the execution stage of the processor's pipeline. The prediction history data for up to four instructions can be added each clock cycle at the input ports 26A–26D. The prediction history data are added in order of increasing address from the bottommost empty location. That is, the data through the input port 26A, which receives the prediction history for the instruction at PC, enters the bottommost empty entry of the FIFO 25. The data through the input port 26B enters the entry just above this, and so on.

While the prediction history of the instruction is provided to the input port 26A, the instruction's address, PC, is supplied by the bus 13 through an address input port 30 of the FIFO 25. The Instruction Decode FIFO 25 contains logic which associates with each instruction stored in it the address from which the instruction was fetched.

The Instruction Issue Logic 50 examines the four bottommost instruction in the Instruction decode FIFO 25. The primary responsibility of the Instruction Issue Logic 50 is to determine, for each instruction in the Instruction Decode FIFO 25, just when that instruction can be "issued", i.e., advanced to subsequent stages in the processor pipeline. Two tasks which the Instruction Issue Logic must perform are (1) tracking the availability and location of the result of each instruction which has been issued, and (2) determining the dependencies of each instruction in the Instruction Decode FIFO 25 on previously issued instructions. The particular details of how these tasks are performed are not relevant to the present invention.

As the Instruction Issue Logic issues instructions to subsequent pipeline stages, it removes those instructions from the bottom of the Instruction Decode FIFO 25. In the preferred embodiment, no instruction is issued unless all instructions "below" it in the Instruction Decode FIFO are also issued; thus the Instruction Decode FIFO is truly first-in, first-out.

If the Instruction Decode FIFO 25 contains branch instructions, the Instruction Issue Logic 50 examines the bottommost such instruction. If that is an unconditional taken branch, then the Instruction Issue Logic performs two specific steps: (1) It changes the Program Counter register 11 as directed by the branch instruction so as to alter the sequence in which the instructions are fetched. (2) It removes those instructions following the branch which should not be executed from the "top" of the Instruction Decode FIFO 25.

If the bottommost branch instruction in the Instruction Decode FIFO 25 is a conditional branch, then the Instruction Issue Logic 50 determines, in the manner described above, (1) on which previously issued instruction or instructions does this branch depend, and (2) are the results of those preceding instructions available and, if so, what are the values of those results. If all of the results on which the branch depends are known, then the Instruction Issue Logic 50 evaluates them to determine whether the branch instruction should be taken or not taken. If the branch is to be taken, then the Instruction Issue Logic performs the two steps described above, of altering the Program Counter register 11 and removing any following discarded instructions from the Instruction Decode FIFO 25.

If the bottommost branch instruction in the Instruction Decode FIFO 25 is a conditional branch and the results on which it depends are not available, the Instruction Issue Logic 50 uses a prediction to determine the disposition of the branch. That prediction was generated by a Predict module 16A–16D and written with the branch instruction into the Instruction Decode FIFO via an input port 26A–26D. Again, if the branch is predicted taken, the contents of the Program Counter register 11 are altered and instructions following the branch are discarded from the FIFO 25.

There are three control signal outputs generated by the Instruction Issue Logic 50 which control the writing of the Branch Shelf 20. The Add Entry signal 40 is a logic 1 at every clock cycle at which a conditional branch instruction is being issued, i.e., removed from the bottom of the FIFO 25. Whenever the Add Entry signal 40 is a logic 1, the two-bit Select Branch signal 35 is the index in the FIFO of the branch instruction that is being issued, and the Taken signal 41 is a logic 1 if the branch was taken and logic 0 if it was not.

The Instruction Decode FIFO 25 has four output ports, Fout0–Fout3, to which are connected respectively a data bus 31A–31D and an address bus 32A–32D. Each of these output ports, Fout0–Fout3, generates two pieces of information: a prediction history stored in the FIFO 25 on one of the data buses 31A–31D and the associated instruction address on the corresponding address bus 32A–32D. These four output ports, Fout0–Fout3, output the bottommost four entries in the Instruction FIFO 25.

The data bus 31A–31D and the address bus 32A–32D are connected to the input terminals of a multiplexor 36, which has two selection control lines 35. A SelectBranch control signal generated by the Instruction Issue Logic 50 on the control lines 35 is the index for the oldest conditional branch, if any, among the four outputs of the Instruction Decode FIFO 25. This control signal causes the multiplexor 36 to select the address and prediction state information for that oldest branch from one of output ports, Fout0–Fout3, as output for an address bus 37B and data bus 37A respectively. The address bus 37B is connected directly to the input port 18B of the Branch Shelf 20.

The prediction state information on the data bus 37A goes to an Update module 38. The module 38 "updates," as described below, the prediction state and places that data on a line 39, which is connected to the input port 18A of the Branch Shelf 20. An Add Entry signal on a control line 40 from the Instruction Issue Logic 50 causes the address and updated state information at the input ports 18A and 18B to be written into the Branch Shelf 20 just when a conditional branch instruction in the Instruction Decode FIFO 25 is being issued.

Figure 1:
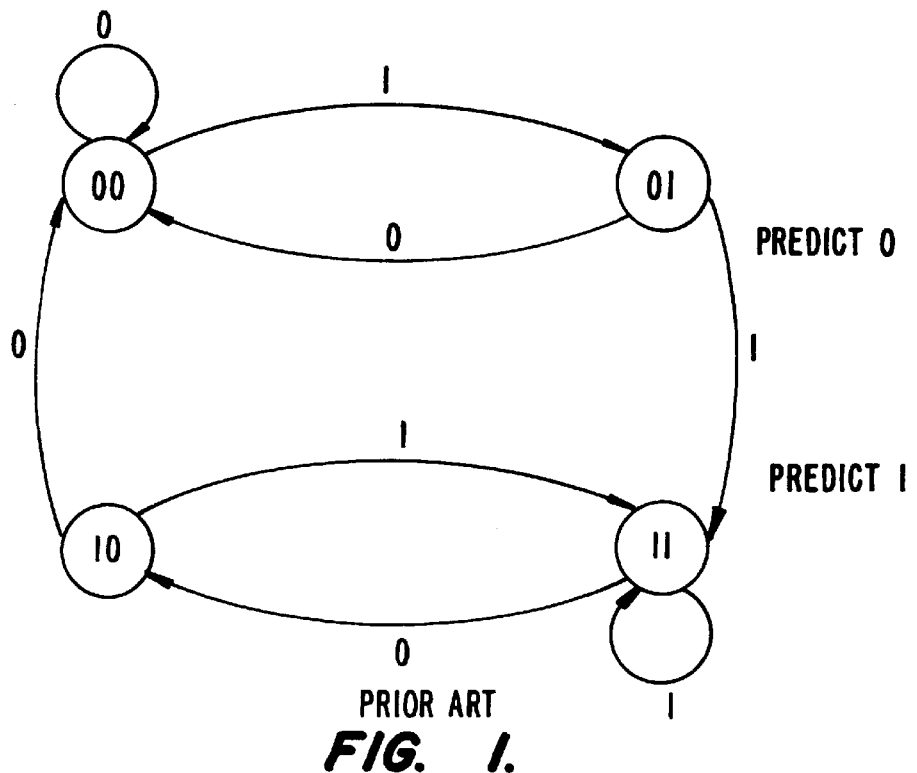
FIG. 1 is a state machine diagram of a branch predictor in the prior art.

The Update module 38, which may be implemented in random logic or ROM-based memory, produces new values for both the four-state branch predictor and the up and down counters. The new value of the branch predictor is computed as shown in the state diagram of FIG. 1. The input to that state machine is the Taken signal 41 generated by the Instruction Issue Logic 50. Its value is logic 1 if the branch is taken and logic 0 if the branch is not taken.

Figure 4:
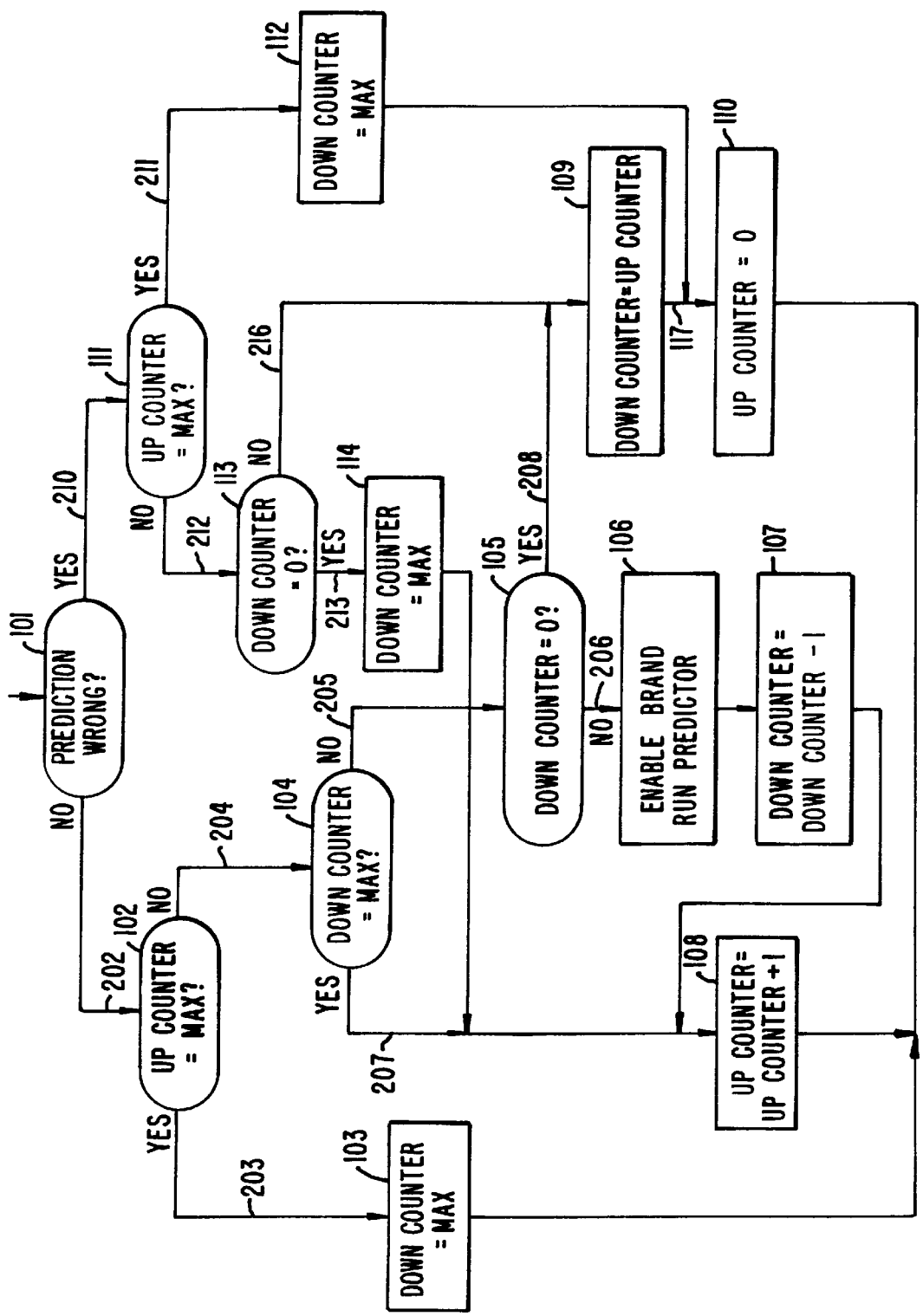
FIG. 4 is an flow chart of the algorithm by which the Update module of FIG. 2 operates.

FIG. 4 shows the algorithm by which the Update module 38 computes new values for the up and down counters. The module 38 first determines whether the predicted direction of the branch is known to be incorrect by step 101. This requires that the data on which the branch depends are known and that the predicted direction, generated by a Predict module 16A–16D and stored in the Instruction Decode FIFO 25, is not the correct direction.

If the prediction is not known to be wrong, path 202 is followed and the Up counter is examined to determine whether it has reached its maximum value by step 102. If so, the branch run length is apparently too long to be tracked by these counters. Path 203 is followed and the Down counter is set to the maximum value (7 in this embodiment of the invention) by step 103. This has the effect of disabling the branch run prediction, as the down counter will not decrement and so will never reach zero. Since the Up counter has already reached the maximum value, it is unchanged.

If the Up counter has not reached its maximum value, then path 204 is followed. By steps 104 and 105, the Down counter is examined to see if it is at the maximum value, zero, or an intermediate value. If the counter is at an intermediate value (following path 205 and 206 after steps 104 and 105 respectively), this means that the branch run prediction is not disabled for this branch and the branch run has not reached the end of the predicted run. Therefore, the Down counter is decremented by 1 by step 107, since it is now one branch execution closer to the end of the predicted run.

If the Down counter is determined to be at its maximum by step 104 or an intermediate value by steps 104 and 105, then the Up counter is incremented by one by step 108. Thus the length of the current run is always maintained in the Up counter (until the counter hits the maximum value), even if the branch run predictor is disabled (path 207 followed after step 104).

If the Down counter is determined to be zero by step 105, then path 208 is followed. The Down Counter is reloaded with the current value of the Up counter by step 109, and then the Up counter is re-initialized to zero by step 110. The Down counter at zero signifies the end of the predicted run, i.e., the first branch to go in the opposite direction. Copying the Up counter to the Down counter predicts that the next run will be the same length as the one just ended. Setting the Up counter to 0 predicts that the next branch after this one contrary branch will the first in a new run. Thus a branch with runs of constant length (less than the maximum counter value), separated by single branches in the opposite direction, will always be predicted correctly.

Turning to step 101, if the branch prediction is known to be wrong, path 210 is followed. The Up counter is checked to determine whether it is at the maximum value by step 111. If the counter has reached the maximum value, then the current run just completed (as indicated by the incorrect prediction) was too long for the counter, but the next run may be short enough. Path 211 is followed and the Down counter is set to the maximum value to disable the branch run predictor by step 112, but the Up counter is re-initialized to zero 110.

If the Up counter is determined not to have reached its maximum by step 111, path 212 is followed. The Down counter is checked against zero by step 113. If the Down counter is at zero, then the current run was predicted incorrectly to have ended, i.e., the predicted length was too short. In this case, the Up counter has been counting the actual length of this run, and should continue to do so. Path 213 is followed and the Down counter is set to the maximum by step 114, to prevent any more predictions during the current run, and the Up counter is incremented by step 108.

If the Down counter is determined not to be at zero by step 113, then the current run was predicted incorrectly not to have ended yet; i.e., the predicted length was too long. Path 216 is followed. The Up counter, which holds the actual length of the current run, is copied to the Down counter to predict the next run to be of that same length by step 109. Then the Up counter is re-initialized to zero 110.

FIG. 5A illustrates the steady-state behavior of the branch predictor on a branch with constant run length of three. The leftmost column indicates the state of the branch predictor, the "Up" column the Up counter value, the "Down" column the Down counter value and the "Prediction" column the prediction bit from the branch predictor. The rightmost column shows the actual direction of the branch, where 1 signifies the branch as taken and 0 signifies the branch as not taken (although the same behavior would obtain with these values reversed). This column shows repeated patterns of one 0 followed by three 1's. In this case, since the predominant direction is 1, the four-state predictor always predicts 1. Its prediction is the most significant bit of the state; since the contrary runs of 0's are no more than one long, only the least significant bit of this state machine's state ever changes.

As shown in the first row of FIG. 5A, the Down counter is zero and the Up counter equals the length of the run, three. The zero value for the Down counter causes the prediction given by the branch predictor state machine, which prediction is 1, to be complemented by the Predict module 16A–16D. As this 0 branch is issued and written into the Branch Shelf 20, the Update module 38, responsive to the fact that the Up counter is less than maximum and the Down counter is zero, copies the Up counter to the Down counter by step 109 and resets the Up counter to zero by step 110.

The next time this branch is fetched, the values given in the second row of FIG. 5A are read from either the Branch Shelf 20 or the Branch Prediction RAM 10. This time the Predict module 16A–16D will see a non-zero Down counter value and thus enables the unmodified state machine prediction of 1. When this branch is issued, the Update module 38 sees the Up counter less than maximum and the Down counter at an intermediate value between zero and maximum. Therefore the module simply decrements the Down counter by step 107 and increments the Up counter 108. This same behavior is repeated the next two times the branch is fetched and then issued. At the end of this run of 1's, illustrated by row 5 of FIG. 5A, the Down counter again reaches zero, and so the prediction is again complemented and the counters are re-initialized to count the next run.

FIG. 5B shows the behavior when a run of length three is followed by a shorter one, in this case of length two, which is, in turn, followed by a longer run, of length four. In the state illustrated by row 1 of FIG. 5B, the end of the preceding run of length three has been correctly predicted, as in FIG. 5A. The counters are re-initialized (row 2) on the assumption that the next run will also be of length three. The Up counter is incremented and the Down counter is decremented through rows 3 and 4. In row 4, the prediction is still 1, because the predicted run has not been completed, but the actual direction is 0.

As a subsequent time, the correct direction of the branch issued in row 4 becomes known. The branch repair mechanism discards the effects of that branch and all instructions following it. Then that branch will be re-fetched and re-issued. The values of the state machine and the counters on the re-fetch (illustrated by row 4') are the same as they were on the original fetch (illustrated by row 4). This is true because the branch repair mechanism has removed all effects of the original issue, including any modifications to the Branch Shelf 20; those modifications were never written into the Branch Prediction RAM 10 because that branch had not yet been resolved.

When the branch is re-issued following the repair, the Update module 38 compares the prediction, which is again 1, against the known correct direction of 0 to determine that the prediction is wrong. Path 210 is followed after step 101. Since the Up counter is less than the maximum and the Down counter is not zero, the Update module 38 copies the Up counter to the Down counter and resets the Up counter to 0, as illustrated in row 5 of FIG. 5B. Thus the branch run predictor is set to predict that the next run should be of length two.

The Up and Down counters count out a predicted run length of two in rows 6 and 7. The branch issued in row 7 is predicted to be the end of the run, since the Down counter is zero. Thus the prediction is changed to 0. This is subsequently discovered to be an incorrect prediction, so that branch is re-issued with the same values for the predictor, illustrated in row 7'. This time, the Update module 38 determines by step 101 that the prediction was wrong and path 210 is followed once again. After determining that the Up counter was not at maximum by step 111, subsequent step 113 determines that the Down counter is zero. In this case, the actual length of the run is still unknown, and so its end cannot be predicted. Therefore, the Down counter is set to the maximum value by step 114 to prevent any attempt to predict the end of the run. The Up counter continues to increment 108 to count the length of the current run.

The predictions in rows 8 and 9 are taken directly from the state machine predictor because the Down counter is disabled. The branch issued in row 9 is predicted to be 1 and discovered to be 0, which indicates the end of a run of length four (rows 5, 6, 7, and 8). When this branch is re-issued (row 9'), the Update module 38 again determines that the prediction was wrong by step 101. After step 111 and path 212, the Down counter is determined not to be zero by step 113, so the Up counter is copied to the Down counter by step 109 and the Up counter is re-initialized to zero by step 110. Therefore, in row 10, the branch run predictor is set to predict that the next run will be of length four.

Without the branch run predictor, all of the branches in the example shown in FIG. 5B would have been predicted as 1. Therefore, the branches in rows 4 and 9 would have been incorrectly predicted, but the branch in row 7 would have been correctly predicted. I.e., an extra branch repair occurs whenever a run shorter than 7 is followed by a longer run. When a run of length seven or less is followed by a shorter run, as in row 4, a repair occurs with or without the branch run predictor. Whenever a short run is followed by one of the same length, the branch run predictor avoids a branch repair.

The branch prediction rate for branches of constant or slowly-varying run lengths can be significantly improved through the use of the invention. Branches of rapidly-varying run length may have worse performance, depending on the exact distribution of run lengths.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claim.

What is claimed is:

1. A method of operating a computer system fetching a sequence of instructions from an instruction memory for execution in said computer system, said sequence including both unconditional and conditional branch instructions, said method comprising:

reading in each clock cycle at least one instruction from said instruction memory at an address in a program counter;

classifying each branch instruction from said instruction memory as unconditional, conditional and known to be taken, conditional and known not to be taken, or speculative;

predicting a run length for each speculative branch instruction in said sequence equal to the most recent run length greater than one for said speculative branch instruction condition by counting the number of times a controlling condition for a speculative branch instruction remains in one state before changing to a second state to determine a run length of said speculative branch instruction up to a predetermined amount; and altering said program counter for the reading step of the following clock cycle as directed by a first branch instruction, if any, that is classified either unconditional, known to be taken, or predicted to be taken responsive to said predicting step;

whereby said operating method correctly predicts a condition controlling a conditional branch stored in said instruction memory if said condition exhibits a consistent looping behavior.

2. An operating method according to claim 1 wherein said predicting step predicts a condition controlling a speculative branch instruction to be the same as for the last two or more fetches of said speculative branch instruction when a current run length of said speculative branch instruction equals or exceeds said predetermined amount.

3. An operating method according to claim 1 wherein said counting substep includes counting the number of fetches of said speculative branch instruction since its last fetch having a condition known or predicted to be complementary to that condition unchanged for the last two or more consecutive fetches of said speculative branch instruction.

4. An operating method according to claim 3 wherein said predicting step includes storing said number of fetches of said speculative branch instruction since its last fetch having a condition known or predicted to be complementary to that condition unchanged for the last two or more fetches of said speculative branch instruction.

5. An operating method according to claim 4 wherein said predicting step includes comparing the previous run length to the current number of fetches of said speculative branch instruction and assuming said controlling condition to be the same as for the last two or more fetches of said speculative branch instruction unless said previous run length equals said current number of fetches.

6. An operating method according to claim 5 wherein said predicting step includes determining whether said previous run length equals or exceeds a predetermined amount.

7. An operating method according to claim 6 wherein said assuming substep assumes said controlling condition to be the same as for the last two or more fetches of said speculative branch instruction unless said previous run length is less than said predetermined amount and equals said current number of fetches.

8. An operating method according to claim 1 wherein said predicting step includes associating a first binary counter with each conditional branch instruction;

initializing an associated counter upon a fetch of a conditional branch instruction if said branch instruction is not a re-fetch of said branch instruction and is known or predicted to have a controlling condition complementary to that of an immediately previous fetch of said branch instruction, or is a re-fetch and had been predicted to have said controlling condition to be the same as that of an immediately previous fetch of said branch instruction; and incrementing said counter by one at each subsequent fetch of said branch instruction unless said counter has reached a predetermined maximum count.

9. An operating method according to claim 8 wherein said predicting step further comprises
   associating a second binary counter with each conditional branch instruction, said second counter a maximum count the same as said first binary counter;
   predicting said controlling condition of an associated branch instruction to be complementary if and only if said second counter holds a zero count; and
   modifying said second binary counter at each fetch of said branch instruction responsive to whether said fetch is a re-fetch necessitated by an incorrect prediction at an earlier fetch of said branch instruction.

10. An operating method according to claim 9 wherein if said fetch is not a re-fetch of said branch instruction, said second binary counter modifying substep further includes
    setting said second binary counter to said maximum count if the first binary counter holds said maximum count;
    otherwise decrementing said second binary counter by one unless it holds a zero count; and
    copying the count in first binary counter to said second binary counter if said second binary counter holds a zero count.

11. An operating method according to claim 9 wherein if said fetch is a re-fetch of said branch instruction, said second binary counter modifying substep further includes
    copying the count in said first binary counter at the time of the earlier fetch to the second binary counter unless said controlling condition of said earlier fetch had been predicted to be complementary to that condition unchanged for the last two or more fetches of said conditional branch instruction; and
    setting said second binary counter to said maximum count if said controlling condition of said earlier fetch had been predicted to be complementary to that condition unchanged for the last two or more fetches of said conditional branch instruction.

12. An operating method according to claim 11 wherein said predicting step comprises
    recovering said controlling condition of said branch instruction unchanged for the last two or more fetches of conditional branch instruction and counts in said first and second binary counters for said branch instruction immediately prior to the fetch of said branch instruction being re-fetched.

13. An operating method according to claim 12 wherein said predicting step comprises
    storing said controlling condition of said branch instruction unchanged for the last two or more fetches of conditional branch instruction, said counts in said first and second binary counters for said branch instruction, and an instruction memory address of said branch instruction at each fetch of said branch instruction.

14. An operating method according to claim 1 wherein said predetermined amount comprises seven.

15. A method of predicting the direction of a conditional branch instruction in a computer, comprising
    determining a first run length of said branch instruction up to a predetermined limit;
    counting a next run length of said conditional branch instruction;
    predicting said next run length so be the same as said first run length unless said next run length ends before equaling said first run length or exceeds said first run length;
    predicting said next run length continues indefinitely if said next run length exceeds said first run length; and
    whereby incidence of correctly predicted conditional branch instructions is enhanced.

16. The method of claim 15 further comprising
    determining the length of said next run of said branch instruction if said next run length ends before equaling said first run length;
    counting the length of the run of said conditional branch instruction following said next run; and
    predicting said run following said next run length to be the same as said next run length unless said run following said next run ends before equaling said next run length or exceeds said next run length.

17. A method of predicting the direction of a conditional branch instruction in a computer, comprising
    determining a first run length of said branch instruction up to a predetermined limit comprising seven;
    counting a next run length of said conditional branch instruction; and
    predicting said next run length to be the same as said first run length unless said next run length ends before equaling said first run length or exceeds said first run length;
    whereby incidence of correctly predicted conditional branch instructions is enhanced.

18. A method of predicting the outcome of a condition controlling a branch instruction in a computer system, comprising
    determining a limited number of times said controlling condition is in a first state before changing into a second state;
    predicting that said controlling condition remains in said first state the same number of times before changing to said second state; and
    taking said branch instruction in accordance with said predicting step, including taking said branch instruction according to said first state of said controlling condition said number of times; and then not taking said branch instruction according to said second state of said controlling condition.

19. The method according to claim 18 wherein said determining step includes
    maintaining a first count of the current run length of said conditional branch instruction; and
    maintaining a second count responsive to said first count and the most recently completed run length of said conditional branch instruction.

20. The method according to claim 19 wherein said first count is maintained by incrementing said first count each time said speculative branch instruction is correctly taken.

21. The method according to claim 19 wherein said second count is maintained by decrementing a count of said most recently completed run length each time said conditional branch instruction is correctly taken.

22. The method according to claim 18 wherein said determining step includes
    maintaining a first count of the current run length of said speculative branch instruction by incrementing said first count each time said speculative branch instruction is correctly taken; and
    maintaining a second count responsive to said first count and the most recently completed run length of said conditional branch instruction by decrementing a count of said most recently completed run length each time said conditional branch instruction is correctly taken; and wherein said second state taking step is performed when said second count reaches zero.

23. The method according to claim 22 wherein said predicting step further includes
- restarting said first count if said current run length exceeds a predetermined limit when said taken branch instruction is wrongly predicted; and
- setting said second count to said previous first count for said most recently completed run length of said conditional branch instruction.

24. The method according to claim 22 further comprising copying said second count from said first count for said recently completed run length of the conditional branch instruction if said current run length is shorter than said most recently completed run length; and
- restarting said first count.

25. The method according to claim 18 wherein said predicting step includes predicting said controlling condition remains in said first state if said controlling condition remains in said first state beyond said limited number of times.

26. The method according to claim 18 wherein said number of times in said determining step is limited to seven.

* * * * *